(12) United States Patent
Hangai et al.

(10) Patent No.: US 8,905,747 B2
(45) Date of Patent: Dec. 9, 2014

(54) BUR REMOVING APPARATUS (75) Inventors: Tomohiro Hangai, Miyoshi (JP); Yohei Uchida, Anjo (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 20 days.

(21) Appl. No.: 13/131,241

(22) PCT Filed: Nov. 26, 2008

(86) PCT No.: PCT/JP2008/071381
§ 371 (c)(1),
(2), (4) Date: May 25, 2011

(87) PCT Pub. No.: WO2010/061437
PCT Pub. Date: Jun. 3, 2010

(65) Prior Publication Data
US 2011/0227246 A1  Sep. 22, 2011

(51) Int. Cl.
*B29C 37/02* (2006.01)
*B29C 49/72* (2006.01)
*B21D 28/16* (2006.01)
*B22D 31/00* (2006.01)

(52) U.S. Cl.
CPC .............. *B22D 31/002* (2013.01); *B21D 28/16* (2013.01)
USPC ........................... 425/289; 425/460; 264/161

(58) Field of Classification Search
None
See application file for complete search history.

(56) References Cited

FOREIGN PATENT DOCUMENTS

| JP | 50-100200 U | 8/1975 |
| JP | 60-42516 U | 3/1985 |
| JP | 07-299554 A | 11/1995 |
| JP | 08-267350 A | 10/1996 |
| JP | 10-291067 A | 11/1998 |
| JP | 11-090718 A | 4/1999 |
| JP | 2004-216405 A | 8/2004 |
| JP | 2004-223638 A | 8/2004 |

OTHER PUBLICATIONS

Translation of JP 60-042516, Mar. 26, 1985.*
International Search Report dated Mar. 3, 2009 of PCT/JP2008/071381.
Office Action issued Jul. 26, 2011 in JP 2010-540245 and English translation thereof.

* cited by examiner

*Primary Examiner* — Benjamin Schiffman
(74) *Attorney, Agent, or Firm* — Kenyon & Kenyon LLP (57) ABSTRACT

A flash removing punch pin is provided with a rotating mechanism wherein a flange is formed on an upper end portion on an outer circumference side portion of a cutting edge portion, and a plurality of grooves are formed in the axis center direction to the side of a casting part from the flange. An inner portion is slidably inserted into an inner cover, and the inner portion and a processing portion are moved by a spring cylinder in a direction to be separated from each other. The spring cylinder is compressed when the punch pin is in proximity to the casting part, and then the flange of the punch pin contacts a flange portion of the casting part. When the inner portion slides into the inner cover, the processing portion rotates along the axis with the inner portion.

4 Claims, 10 Drawing Sheets

BUR REMOVING APPARATUS

This is a 371 national phase application of PCT/JP2008/071381 filed 26 Nov. 2008, the contents of which are incorporated herein by reference.

TECHNICAL FIELD

The present invention relates to a technique for a punch pin, an apparatus and a method for removing flash which is formed with a film shape at the inside of a flange portion of casting parts, and can make the finishing process efficient.

BACKGROUND ART

Conventionally, in plastic injection molding or non-metallic casting, the film flash which is formed in the flange portion of a casting part is removed by means of just using a punch pin. The film flash may remain as leaned flashes attached to the inside of the flange portion.

The leaned flash can be removed with an abrasive blasting, but the blasting process doesn't have functions that can remove large flashes and collect them because a punching is considered as a process to make a precondition to use a blasting.

Thus if the blasting is used for removing the flashes, an additional manual job is needed periodically to collect the flashes in the blasting cabinet, and then it makes product's cost increased.

There is another means of removing the leaned flashes. The flashes can be removed by designing a diameter of the punch pin almost same as the bore of the flange portion. But, the variation of the bore and the setting location of the casting part cause interference between the punch pin and the flange portion, and the casting part may be scratched and damaged, or the punching process may be stopped with overload.

Some techniques are proposed to solve the above-mentioned problems, for example, utilizing another power source with the punch pin to remove the leaned flashes (referring to JP H08-267350 A or JP 2004-223638 A).

JP H08-267350 A proposes the technique that the flashes are removed manually after automatically removed roughly.

JP 2004-223638 A proposes the technique that the tool portion has a rotating power to remove the flashes, which is independent from the power for the punch pin motion.

SUMMARY OF INVENTION

Technical Problem

The above-described conventional methods need not only the ordinary power for a punch pin motion but another power, and those make the structure complex and the cost increased.

The objective of the present invention is to provide the method which is not used another power to remove the film flash and the leaned flashes, and that doesn't need the additional manual job and the cost.

Technical Solution

The following are expressions to solve the technical problems.

The first aspect of the present invention is a punch pin to remove a film flash formed at the inside of a flange portion of a casting part, which is moved toward and away from the part, and the aspect includes a supporting base and processing portion that is assembled to the supporting base. The processing portion has a contact surface with the flange portion of the part, and has multiple grooves along the axis direction. One of the supporting base and the processing portion has a cylindrical portion to be able to insert each of them, and those are equipped with a rotation structure, which is able to make translational motion smoothly with rotating to opposite direction to the each other. When the punch pin close to the part, the contact surface is attached to the flange, and the supporting base and the processing portion get a force to be inserted, and then it is rotated with the supporting base along the axis as its rotation center.

In the advantageous embodiment of the present invention, the rotation structure consists of an outer surface of the inserting portion and an inner surface of the inserted portion, and the one of which has multiple spline grooves inclined with the axis direction, the other has sliding portions with the spline grooves, and those are assembled with being able to translation, and rotated relatively along the axis with their translations.

The second aspect of the present invention is an apparatus for removing flashes including the punch pin described in the first aspect of the present invention.

The third aspect of the present invention is a method for removing flashes using the punch pin according to the first aspect of the present invention. The flash removing method includes a punching process for the film flash with moving the punch pin toward the part, which has the flash, a removing process for the leaned flash by means of the grooves on the processing portion surface with rotating along the axis with a translation between the supporting base and the processing portion, and a separation process of its moving from the part.

Advantageous Effects of Invention

Advantageous effects of invention are described below.

The film flashes and the leaned flashes can be removed with a simple structure, which is composed of the punch pin, the apparatus and the method, and that doesn't need an additional power, thereby the processing costs can be reduced.

DESCRIPTION OF EMBODIMENTS

The best mode for carrying out the present invention is described below.

It should be noted that the scope of the invention is not limited to the embodiment but broadly contains the whole technical idea that is described in the description and the drawings.

[Apparatus for Removing Flash]

Figure 1:
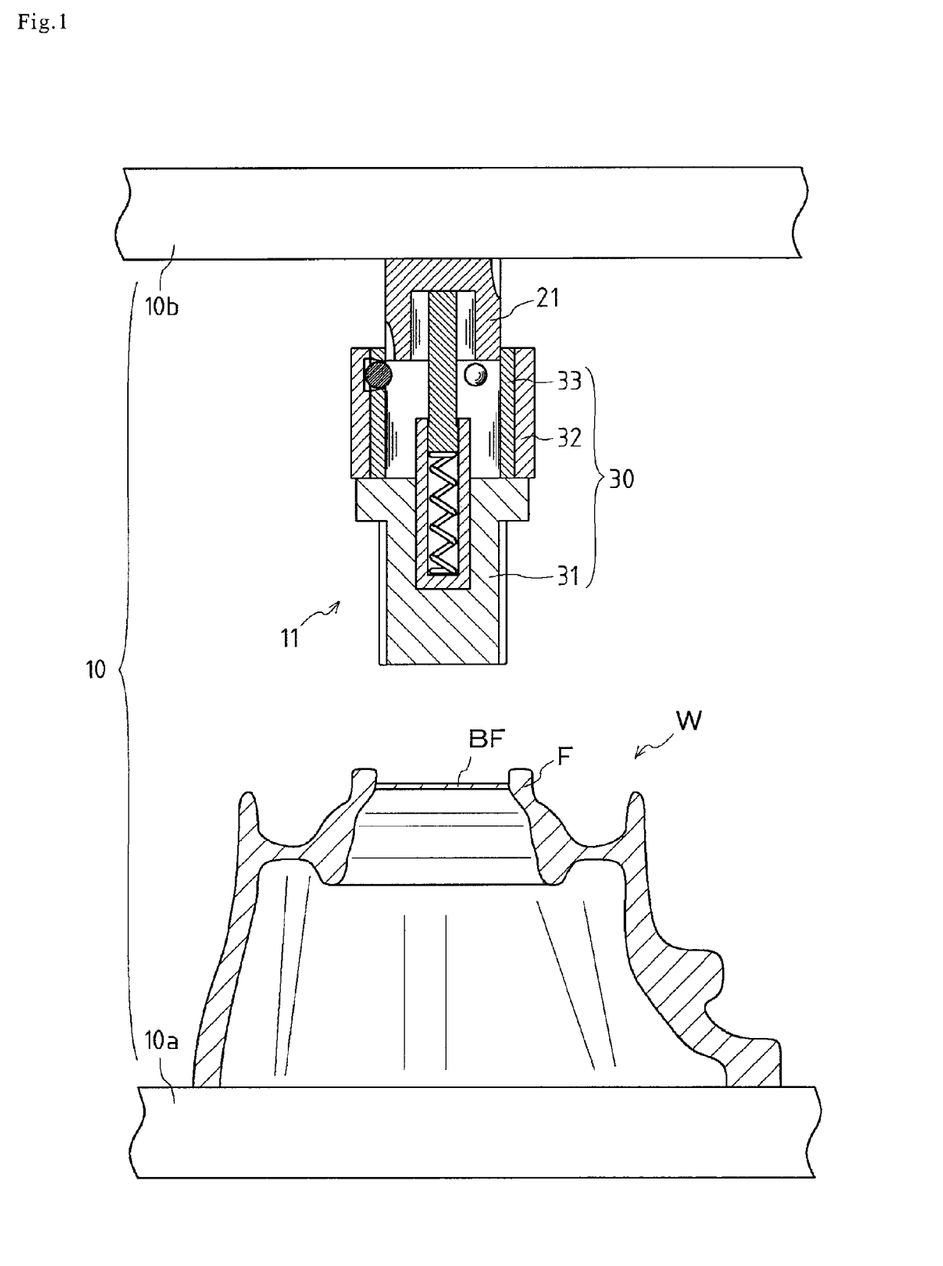
FIG. 1 is a schematic section-view of a flash removing apparatus.

Referring to FIG. 1, an apparatus for removing flashes as one embodiment of the invention is explained. For convenience of explanation, the upper side, lower side, right side and left side in the following description are respectively defined as those of FIG. 1.

As shown in FIG. 1, the flash removing apparatus includes a press equipment 10, which has a fixed plate 10a, a moving plate 10b driven in the vertical direction to move toward and away from the fixed plate 10a, and a punch pin 11 for use in removing flashes mounted on the moving plate 10b, and those axes are in the vertical direction, that is the approaching and separating direction. The moving plate 10b moves with the punch pin 11, and they approach a casting part W disposed on the fixed plate 10a. The punch pin 11 presses a film flash BF formed at the inside of the flange portion F.

[Punch Pin 11]

Figure 2:
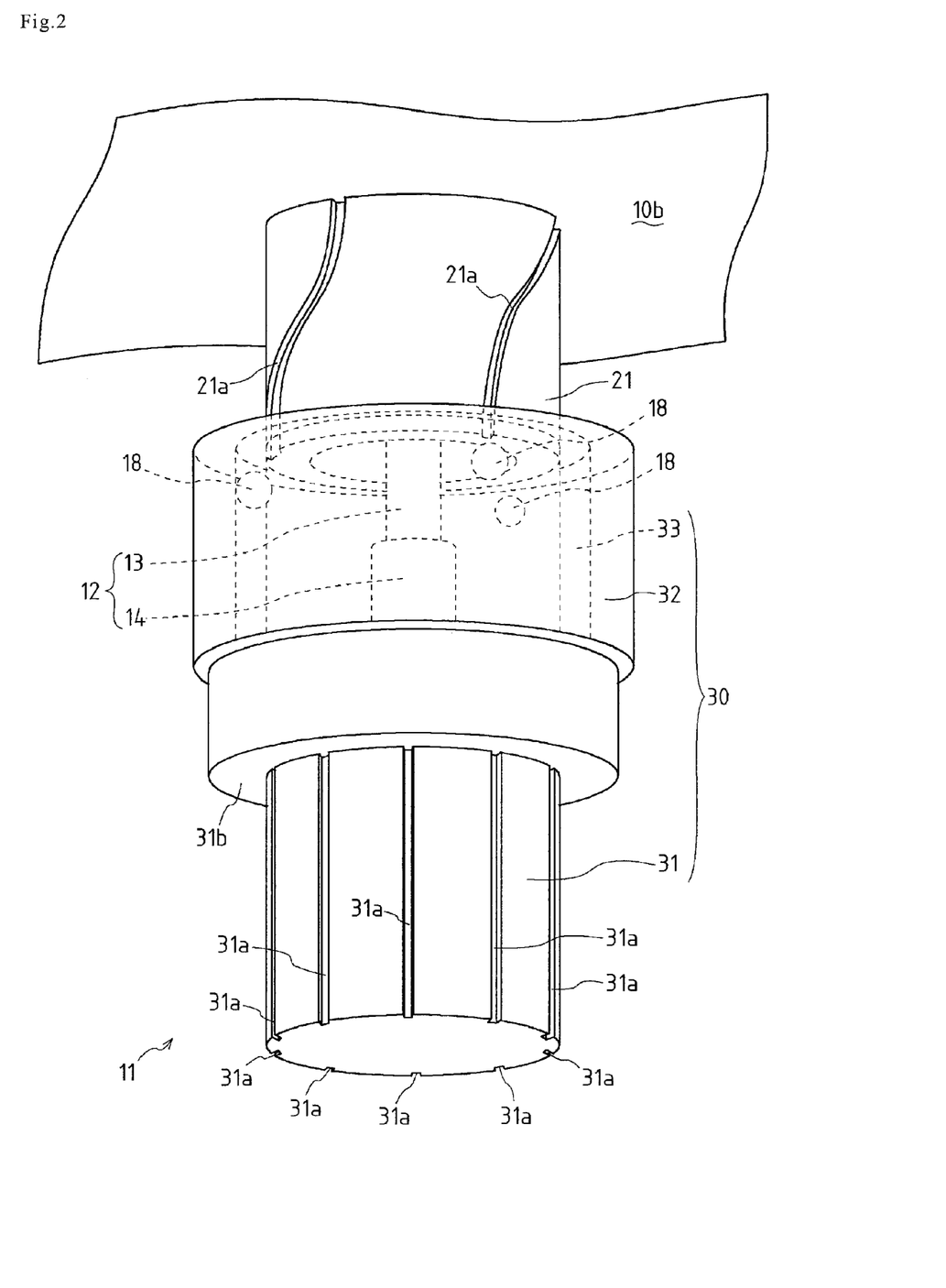
FIG. 2 depicts a punch pin for removing flashes.
Figure 3:
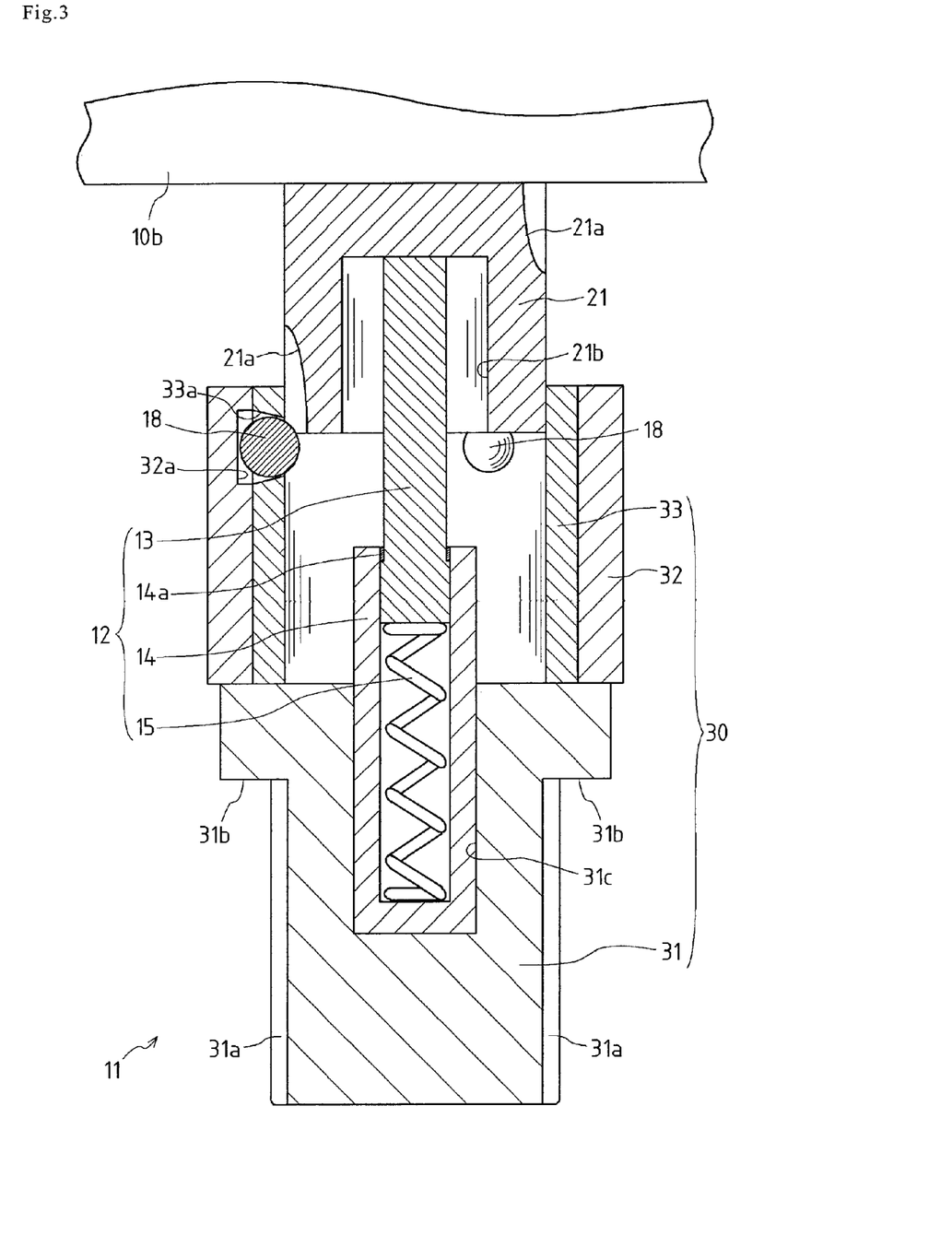
FIG. 3 is a schematic section-view of the punch pin in an initial position.
Figure 4:
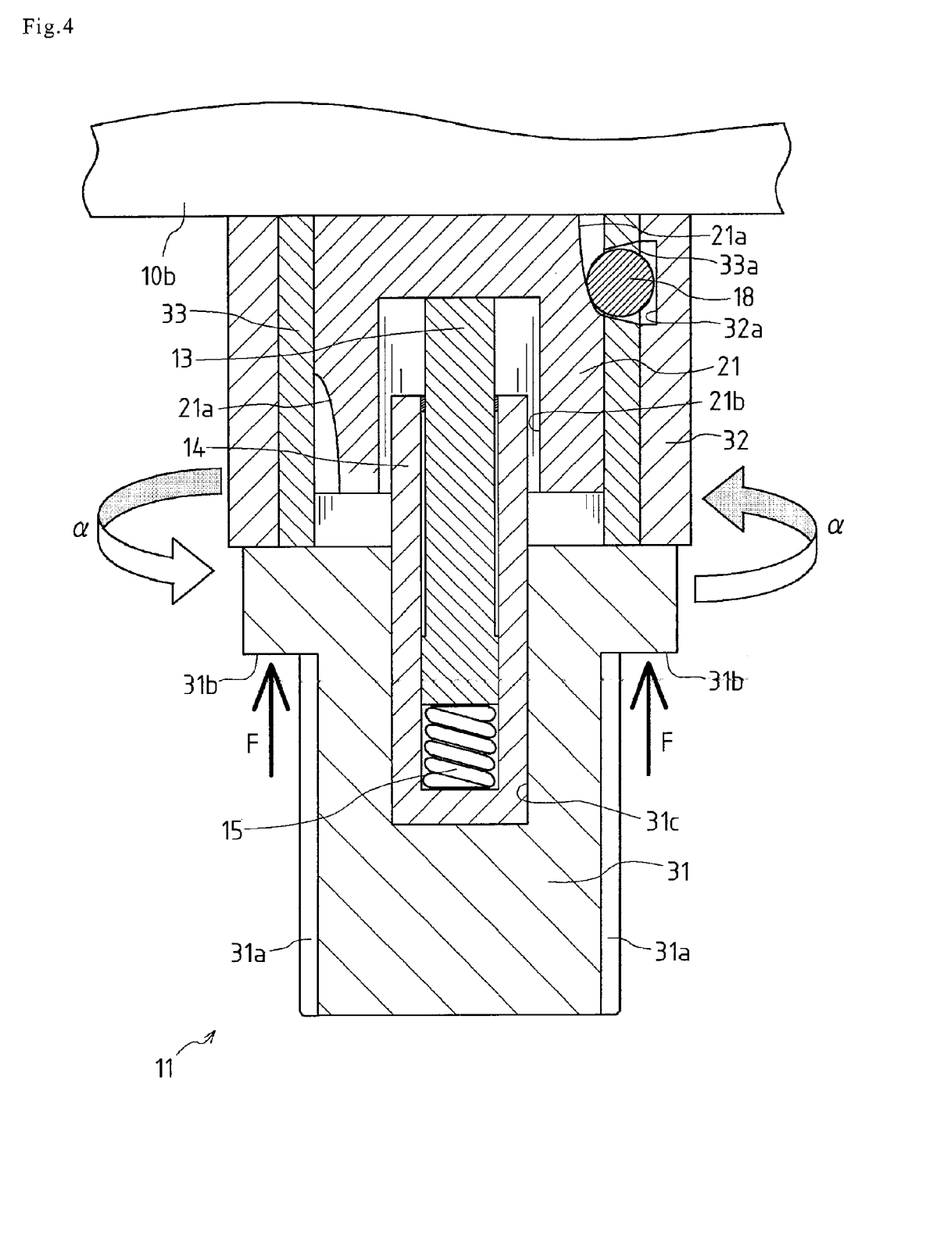
FIG. 4 is a schematic section-view of the punch pin where a spring cylinder is compressed.

The punch pin 11 is explained, referring to FIGS. 2 to 4.

As shown in FIGS. 2 to 4, the punch pin 11 contains an inner portion 21 as a supporting base and a processing portion 30 for removing the flashes supported by the inner portion 21.

The processing portion 30 has a cutting edge portion 31, an outer cover 32 and an inner cover 33, all of which are integrated. The cutting edge portion 31, the outer cover 32 and the inner cover 33 may be formed in one member.

The cutting edge portion 31 is a cylindrical member and has a flange 31b formed at the upper end thereof. The flange 31b has a flat bottom at the outside of the cutting edge portion 31. When the punch pin 11 moves downward with the moving plate 10b and approaches the casting part W, the flange 31b contacts the flange portion F of the casting part W. The cutting edge portion 31 moves downward till the flange 31b is contact with the flange portion F of the casting part W.

The cutting edge portion 31 has multiple grooves 31a formed in the outside and they are disposed at the side of casting part W vertically to the flange 31b. The cutting edge portion 31 has a hole 31c into which a spring cylinder 12 is inserted.

The outer cover 32 and the inner cover 33 are formed as hollow cylinders, and the shape of the inside of the outer cover 32 is the same as that of the outside of the inner cover 33. The inner cover 33 is inserted in the outer cover 32, and both of them are arranged above the cutting edge portion 31.

The outer cover 32 has three holes 32a at the upper portion of the inside, which are apart 120 degrees from each other. The inner cover 33 has three-through-hole 33a at the corresponding portion to the holes 32a, the diameters of which are tapered inward. In the spaces defined by the holes 32a and through holes 33a, three sliding balls 18 are rotatably housed. The inner cover 33 is inserted in the outer cover 32 such that the through hole 33a and the ball 18 are arranged in accordance with the position of the hole 32a, where the balls 18 are housed in the through holes 33a.

Noted that the balls 18, the holes 32a and the through holes 33a are provided with three as disposed apart 120 degrees around the axis. The numbers of those are not limited to three, and may be two or less or four or more.

The inner portion 21 has a cylindrical shape, and the outside is formed in the same shape as the inside of the inner cover 33. That is, the inner portion 21 is formed as a cylindrical portion and inserted into the inner cover 33 of the processing portion 30, which is formed as a hollow cylindrical portion. In such structure, the inner portion 21 is slidably inserted into the inner cover 33, and the inner portion 21 is connected with the inner cover 33.

The inner portion 21 has three spline grooves 21a, which are inclined against the axis direction and apart 120 degrees from each other. The spline grooves 21a are curved and have S shape, but they may have straight shape (from the upper end to the lower end of the inner portion 21) in the developed view.

The balls 18 are slidably engaged with the spline grooves 21a, and the processing portion 30 slides along the inner portion 21 in the axis direction, thereby rotating around the axis.

Between the inner portion 21 and the processing portion 30, the spring cylinder 12, as a biasing member, is arranged to separate these portions from each other. The inner portion 21 has a hole 21b at the bottom center, in which a piston 13 of the spring cylinder 12 is fitted. Into the hole 31c of the cutting edge portion 31, a cylinder 14 containing a coil spring 15 is inserted. The piston 13 is inserted in the cylinder 14 and a stop 14a is disposed at the top of the cylinder 14, so that the processing portion 30 is connected to the inner portion 21 via the spring cylinder 12.

Due to the above-described structure, when the punch pin 11 moves toward the casting part W and the flange 31b contacts the flange portion F, the flange portion F presses the flange 31b toward the arrow-F direction in FIG. 4, and the processing portion 30 is pressed toward the inner portion 21 in response to the pressure of the spring cylinder 12. Then, the spring cylinder 12 is compressed.

As the inner portion 21 slides along the inner cover 33, the sliding balls 18 slide along the spline grooves 21a, whereby the processing portion 30 rotates around the axis of the inner portion 21 along arrow-a direction in FIG. 4. The sliding member composed of the balls 18 and the spline grooves 21a functions as a rotation mechanism for rotating the processing portion 30 with respect to the inner portion 21 around the axis thereof.

It should be noticed that, in this embodiment, the processing portion 30 rotates along the arrow-α direction with the inner portion 21, but in the other embodiment, the spline grooves 21a may be reversely formed to rotate the processing portion 30 along the reverse-arrow-α direction. Further, as the sliding member, the balls 18 may be replaced with the wheel shaped members or pillar members, i.e., the structures enabled to smoothly slide along the spline grooves 21a.

[Method for Removing Flashes]

Referring to FIGS. 5 to 10, the method for removing flashes using the apparatus configured with the punch pin 11 is explained below.

The removing method includes removing the film flash BF of the casting part W by means of the punch pin 11 provided with the cutting edge portion 31 at the processing portion 30, removing the leaned flashes BT caused in a process of removing the film flash by means of the grooves 31a formed in the cutting edge portion 31 that is rotated around the inner portion 21, and moving the punch pin 11 away from the casting part W.

Figure 5:
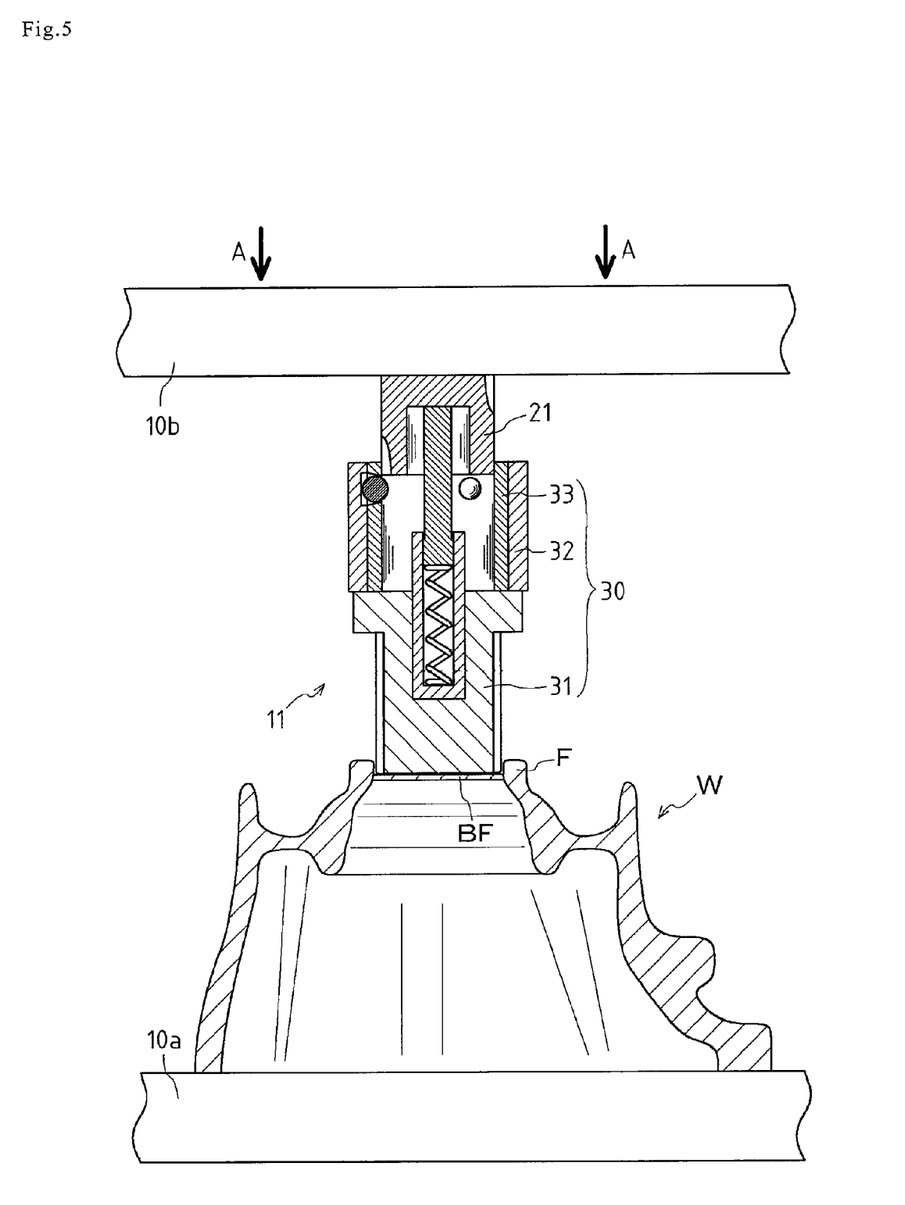
FIG. 5 is a schematic section-view of the flash removing apparatus in a process to remove a film flash.

As shown in FIG. 5, in the film flash removing process, the moving plate 10b moves downward, or along the arrow-A direction in FIG. 5, with the punch pin 11, and they approach the casting part W mounted on the fixed plate 10a, and then the bottom of the cutting edge portion 31 contacts the film flash BF. The punch pin 11 travels downward along the arrow-B direction in FIG. 6, and the film flash BF is pressed and removed from the flange portion F of the casting part W. The film flash BF is not perfectly removed and attached to the inside of the flange portion F, thereby remaining the leaned flashes BT. It should be noted that the spring cylinder 12 is not compressed when the film flash BF is pressed, because the spring force of the coil spring 15 installed in the spring cylinder 12 is stronger than the pressing force to the film flash BF.

Figure 6:
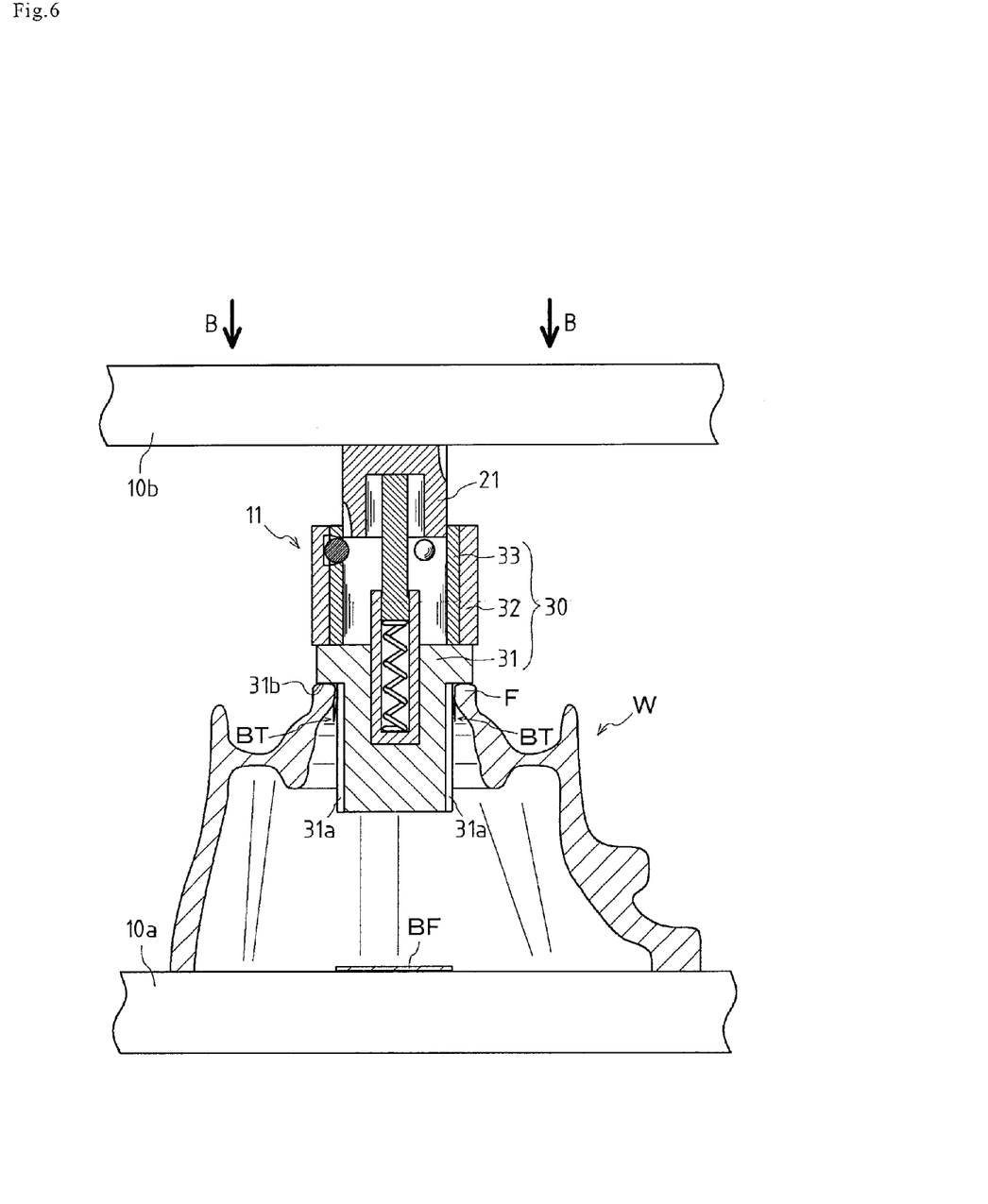
FIG. 6 is a schematic section-view of the flash removing apparatus in transition from the process of removing the film flash to a process of removing leaned flashes.
Figure 7:
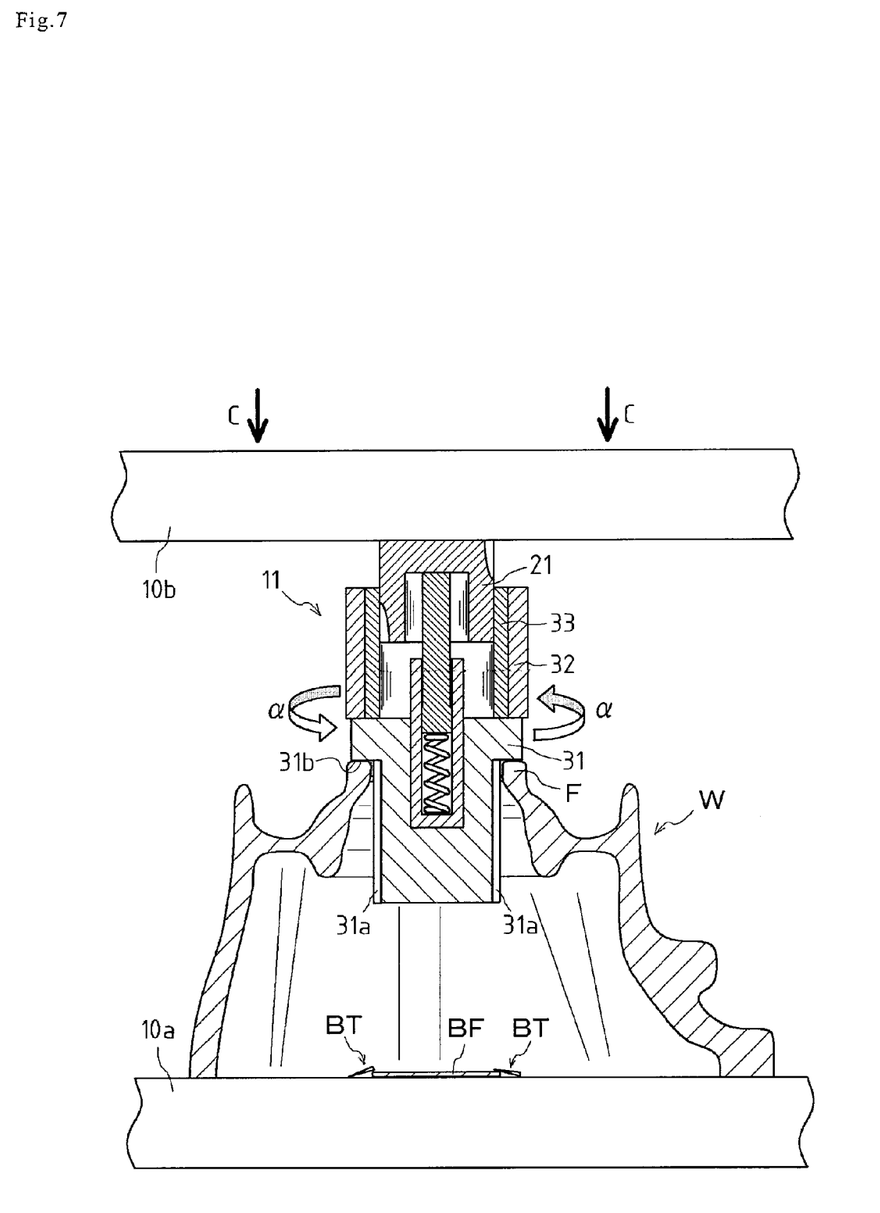
FIG. 7 is a schematic section-view of the flash removing apparatus in the process of removing leaned flashes.

After the flange 31b contacts the flange portion F as depicted in FIG. 6, the leaned flash removing process is performed. The punch pin 11 goes down along the arrow-C direction in FIG. 7, and the flange portion F presses the flange 31b with compressing the spring cylinder 12. The sliding balls 18 slide along the spline grooves 21a, so that the processing portion 30 rotates around the axis of the inner portion 21 along the arrow-α direction in FIG. 7. Thus, the punch pin 11 is rotated around the inner portion 21 and the grooves 31a formed at the surface of the cutting edge portion 31 remove the leaned flashes BT.

The simple structure effect is shown in the process of the removing leaned flashes, the power source is exactly same as for the film flash BF, which is for the movement of the moving plate 10b.

Figure 8:
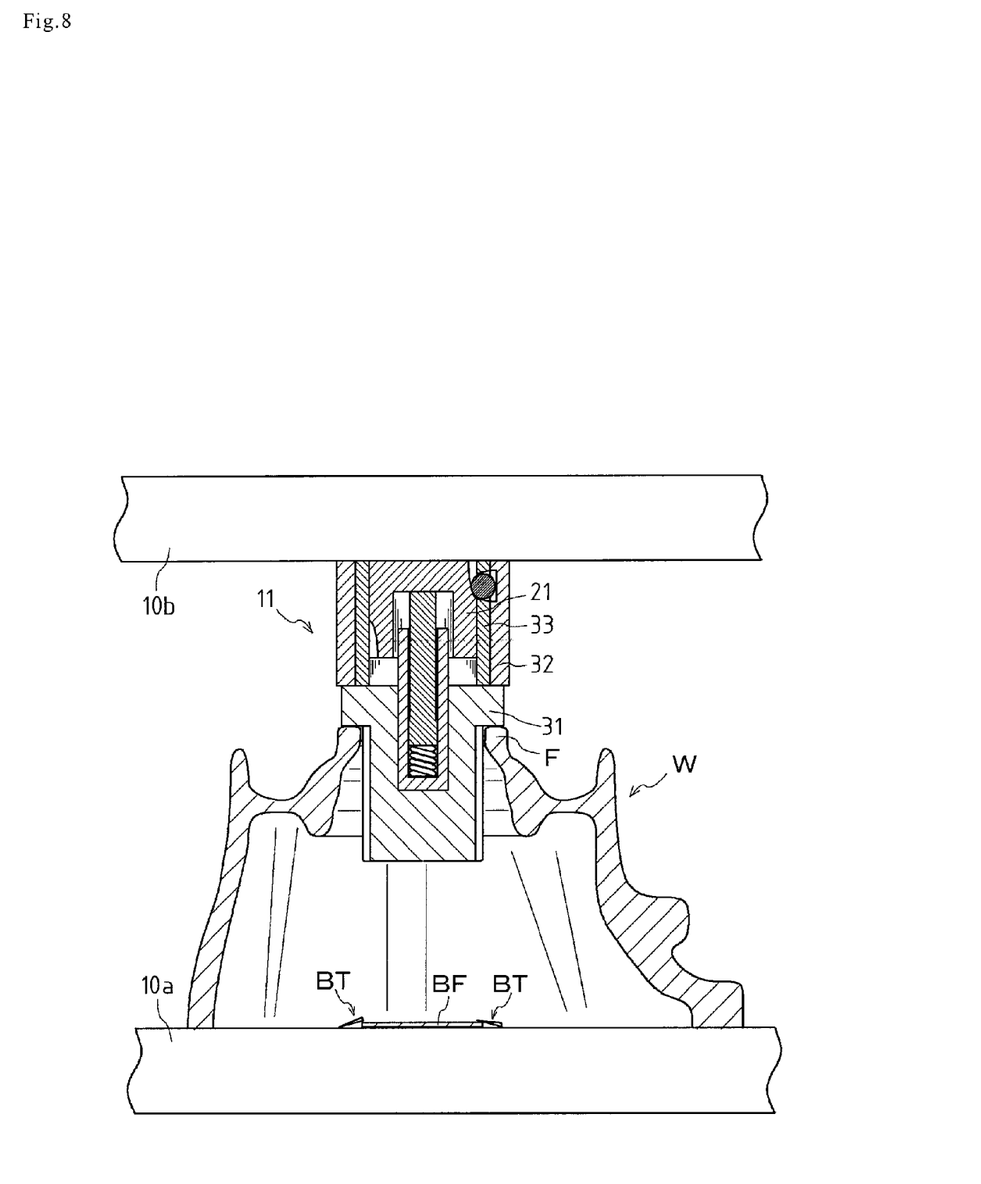
FIG. 8 is a schematic section-view of the flash removing apparatus in transition from the process of removing leaned flashes to a process of separation.
Figure 9:
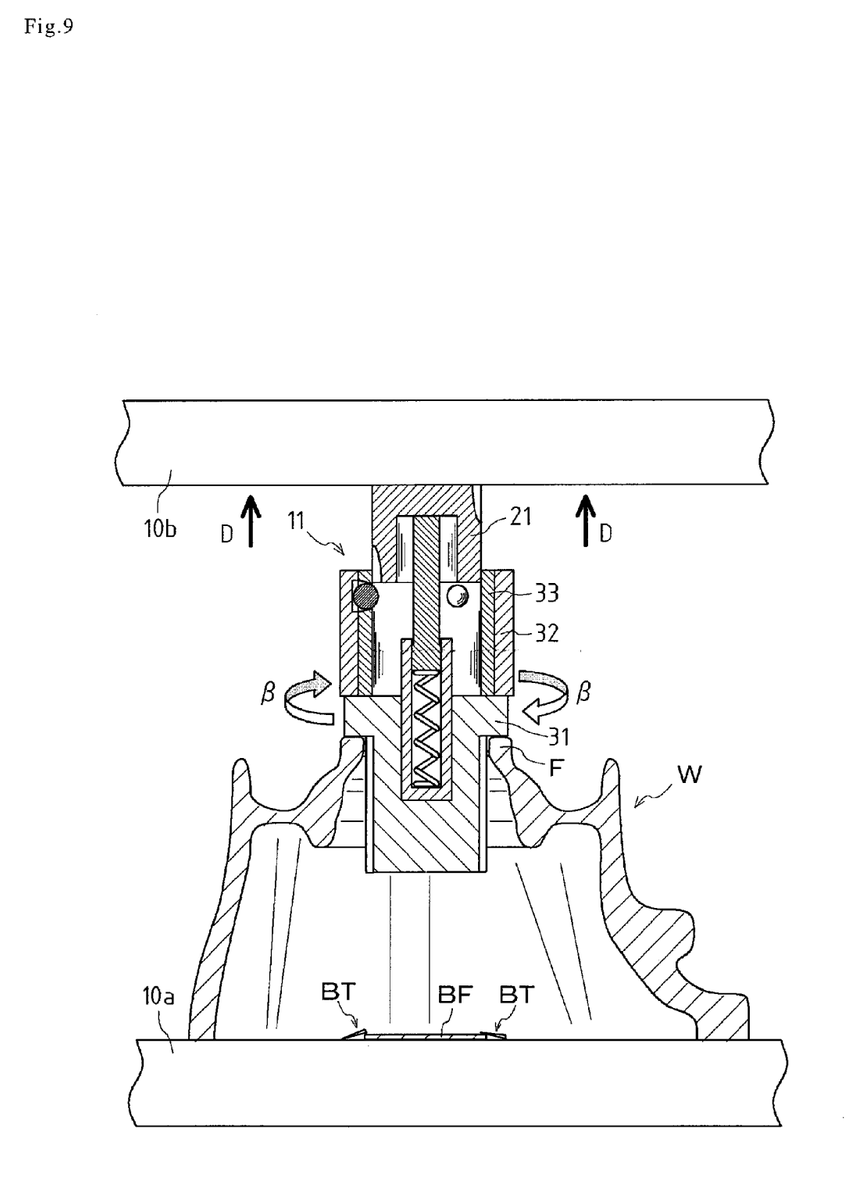
FIG. 9 is a schematic section-view of the flash removing apparatus in the process of separation.
Figure 10:
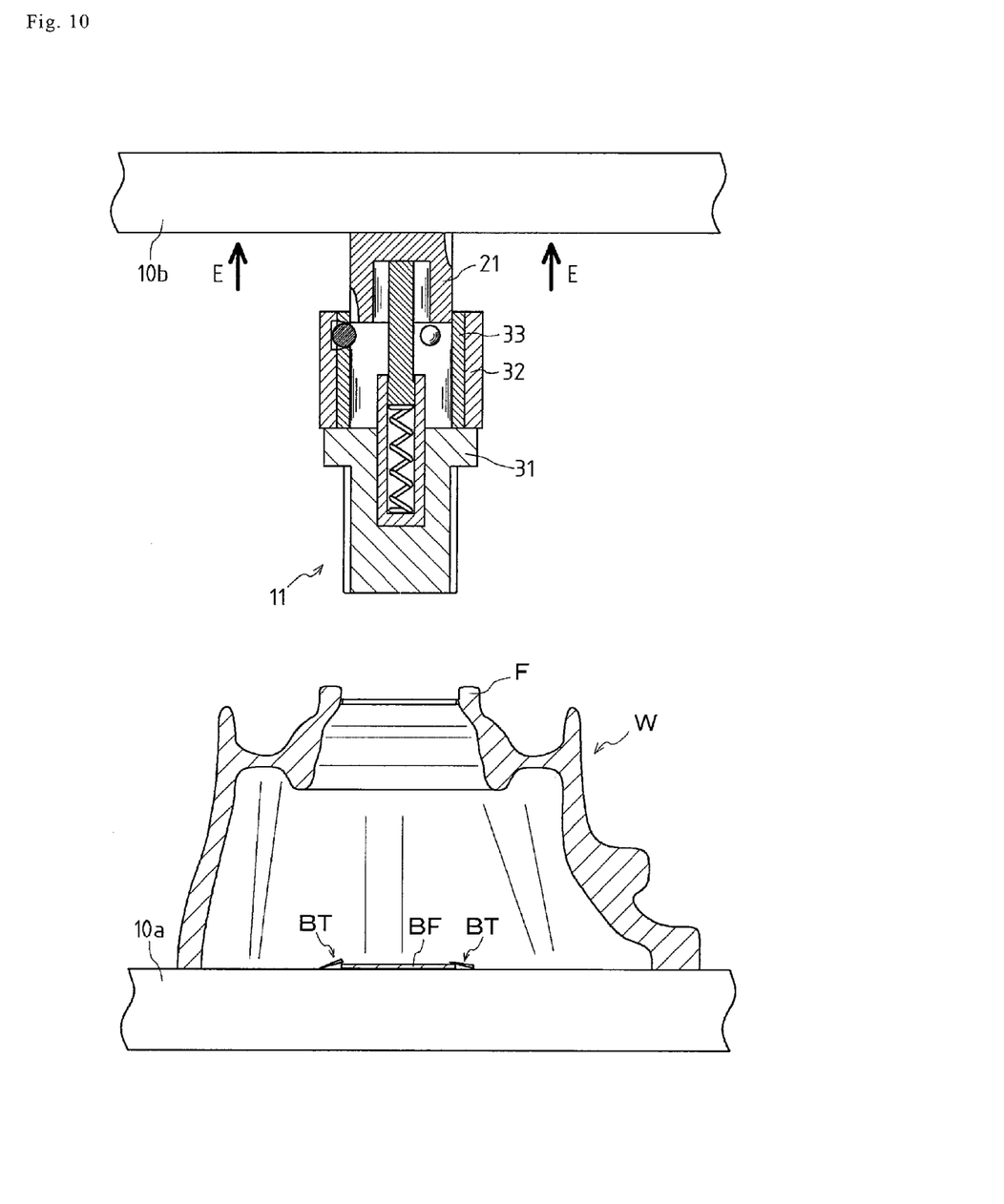
FIG. 10 is a schematic section-view of the flash removing apparatus after the process of separation.

As shown in FIG. 8, after the moving plate 10b reaches the bottom end with the punch pin 11, the punch pin is separated form the casting part. The moving plate 10b moves upward along the arrow-D direction in FIG. 9, the spring cylinder 12 is extended in response to the spring force of the coil spring 15. The sliding balls 18 slide reversely along the spline grooves 21a. Thus, the processing portion 30 rotates around the inner portion 21 along the arrow-β direction in FIG. 9, that is the opposite direction to the above-described direction. The cutting edge portion 31 rotates around the inner portion 21 along the reverse direction to the process of removing leaned flashes, thereby the leaned flashes BT can be eliminated even if they are remaining after the pre-process with the rotation to the a direction. The moving plate 10b goes up along the arrow-E direction in FIG. 10, and the punch pin 11 moves away from the casting part W and returns to the initial position.

The leaned flashes BT are removed in a series of processes including the process for removing the film flash BF, thereby the invention prevents the costs from increasing due to the additional process for the removing and the collecting flashes.

Moreover, there is no need to increase the outer diameter of the cutting edge portion 31 in order to remove the leaned flashes BT, so that the cutting edge portion 31 is prevented from interfering the flange portion F. The casting part can avoid getting damaged, and the processes can be prevented from stopping for overload.

Further, there is neither need to use another power source nor to use manually hand de-burring to remove the leaned flashes BT, because the structure can be utilized same power for the film flashes. The simple structure without another power source is provided to remove both the film flash BF and the leaned flashes BT, so the processing costs are reduced.

INDUSTRIAL APPLICABILITY

The punch pin 11 for use in removing flashes, the apparatus and method for removing the flashes are applicable to remove the film flash BF formed in the flange portion F of the casting part W. Moreover, both of the film flash BF and the leaned flashes BT are removed by using the simple structure, which consists of the punch pin 11, the apparatus and the method for removing the flashes, without the extra power source and the processing costs are reduced.

The invention claimed is:

1. A punch pin for use in removing a film flash formed at the inside of a flange portion of a casting part, moving toward and away from the casting part, comprising:
   a supporting base; and
   a processing portion supported by the supporting base,
   wherein the processing portion comprises:
      a cutting edge portion being a cylindrical member, the cutting edge portion including a flange formed at the outside of the processing portion, contacting the flange portion of the casting part; and
      multiple grooves formed on the outside of the processing portion cutting edge portion along the axis direction, disposed at the side of the casting part with respect to the flange,
   wherein one of the supporting base and the processing portion has a cylindrical portion and the other has a hollow cylindrical portion, whereby the cylindrical portion is slidably inserted into the hollow cylindrical portion, separated from each other by a biasing member, and
   further comprising a rotation mechanism for rotating the processing portion around the supporting base when the punch pin approaches the casting part to press the film flash, the rotating is actuated by the same power source as to press the film flash, the flange of the cutting edge portion contacts the flange portion of the casting part, the supporting base and the processing portion are each pressed against the biasing member and the cylindrical portion slides into the hollow cylindrical portion, whereby the grooves remove leaned flashes, which are remained parts of the periphery of the film flash attached to the inside of the flange portion.

2. The punch pin according to claim 1,
   wherein the rotation mechanism comprises:
      multiple spline grooves inclined against the axis direction, disposed in one of the outside of the cylindrical portion and the inside of the hollow cylindrical portion; and
      sliding members arranged in accordance with the spline grooves, disposed in the other,
   wherein the sliding members are slidably engaged with the spline grooves along the axis direction, whereby the supporting base and the processing portion rotate relatively.

3. An apparatus for removing flashes, comprising the punch pin according to claim 1.

4. A method for removing flashes using the punch pin according to claim 1, comprising:
   moving the punch pin toward the casting part formed with the film flash, for removing the film flash by means of the processing portion;
   rotating the processing portion around the supporting base, for removing leaned flashes generated in removing the film flash by means of the grooves formed in the processing portion; and
   moving the punch pin from the casting part.

\* \* \* \* \*

UNITED STATES PATENT AND TRADEMARK OFFICE
CERTIFICATE OF CORRECTION

| | | |
|---|---|---|
| PATENT NO. | : 8,905,747 B2 | Page 1 of 1 |
| APPLICATION NO. | : 13/131241 | |
| DATED | : December 9, 2014 | |
| INVENTOR(S) | : Tomohiro Hangai et al. | |

It is certified that error appears in the above-identified patent and that said Letters Patent is hereby corrected as shown below:

In the Claims

At column 6, line 15, Claim 1, change "the processing portion cutting edge portion" to -- the cutting edge portion --.

Signed and Sealed this
Twenty-first Day of July, 2015

Michelle K. Lee
*Director of the United States Patent and Trademark Office*